Aug. 8, 1950

T. K. RIGGEN 2,517,712

ELECTRONIC COUNTER

Filed Jan. 24, 1945

WITNESS:
Esther M. Stockton

INVENTOR.
Theodore K. Riggen
BY
Clinton L. Janes
ATTORNEY

Patented Aug. 8, 1950

2,517,712

UNITED STATES PATENT OFFICE 2,517,712

ELECTRONIC COUNTER

Theodore K. Riggen, Elmira, N. Y., assignor to Bendix Aviation Corporation, South Bend, Ind., a corporation of Delaware Application January 24, 1945, Serial No. 574,434

4 Claims. (Cl. 235—92)

The present invention relates to an electronic counter and more particularly to a device for accumulating and indicating the total of a series of electrical impulses and consequently of any series of events or things which can be expressed or represented by electrical impulses.

Mechanical counters are widely used for recording the occurrences of repetitious events, etc., but they are limited by their construction to rather moderate speeds. Electronic counters are known which are capable of operating at far higher speeds, but such counters are generally capable of satisfactory operation only in connection with phenomena of comparatively uniform frequency. This is caused by the fact that the cumulation of the signal impulses by the counter depends on the time interval between the impulses, since the electronic counter as heretofore designed has no device corresponding to the ratchet and pawl of a mechanical counter for preventing retrograde movement of the dial.

It would be desirable in many arts to be able to count accurately at higher speeds than are now possible with mechanical counters, and with unlimited variations in speed. One specific use for such a counter is for the investigation of stresses in engine starting mechanism of the Bendix type. In such drives the shock of engagement is taken up by a torsion spring, and the wind-up of the spring may be caused to produce light impulses by the use of light sources and perforated discs, etc. Counting such impulses provides an accurate measure of the spring wind-up, and in conjunction with a calibration of the spring affords a precise determination of the peak torque load. These impulses vary in frequency from several thousand per second to zero, and the entire operation may take place in a small fraction of a second. Obviously, no conventional form of counter would be capable of operating at the variable speed necessary for this purpose.

It is an object of the present invention to provide a novel counter and recorder which is capable of operating at any speed up to several millions per second.

It is another object to provide such a device in which the things to be counted are expressed as electrical impulses, and the impulses caused to produce visible effects.

It is another object to provide such a device in which the counting is accomplished by movement of a beam of electrons, so that the speed of the counter is limited only by the physical constants of the electrons.

It is another object to provide such a device incorporating the electronic equivalent of a ratchet for maintaining the position of the beam during the intervals between the reception of signal impulses.

It is another object to provide such a device which is subject to accurate control of starting and stopping, so that the number of impulses occurring after a certain event or between the occurrence of two events may easily be counted.

It is a further object to provide such a device which may conveniently be arranged to operate a signal or perform any desired function when any predetermined number has been counted.

It is another object to provide such a device in which each decimal place is recorded by a unit which may be readily calibrated and adjusted without affecting any other unit.

It is another object to provide such a device in which each unit is similar and interchangeable whereby an instrument may be readily assembled to provide any desired capacity.

Further objects and advantages will be apparent from the following description taken in connection with the accompanying drawing in which.

Figure 1:
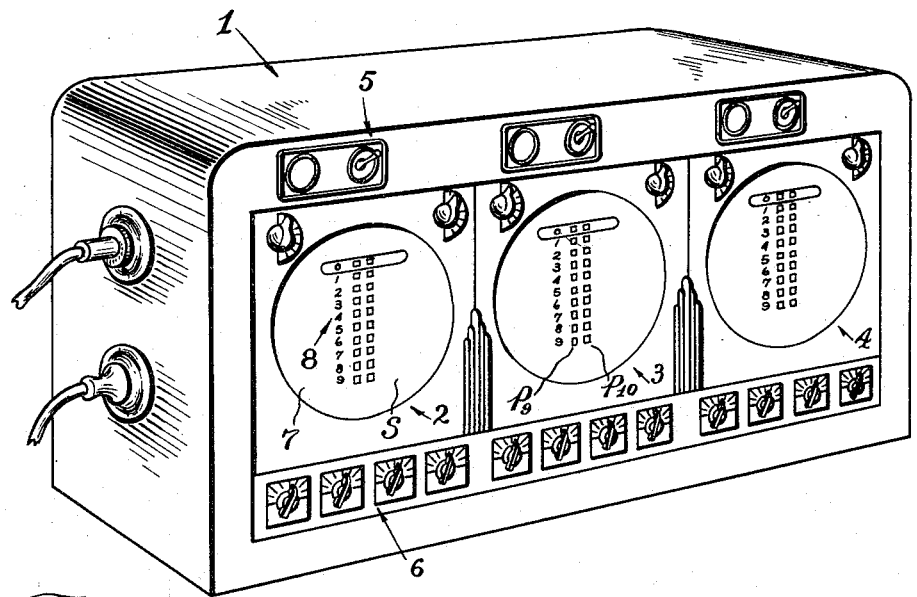
Fig. 1 is a perspective view of a three-unit instrument constructed in accordance with the present invention.

In Fig. 1 of the drawing there is illustrated an instrument 1 comprising three counter units 2, 3 and 4, each comprising an on-and-off switch 5, and a set of controls indicated generally by numeral 6 for focusing and properly locating the electronic beam which is used for the counting operation. Each unit comprises a fluorescent screen 7 which is the screen of a cathode-ray tube and on this screen is inscribed or superimposed a scale 8 of digits running from zero to 9.

Figure 2:
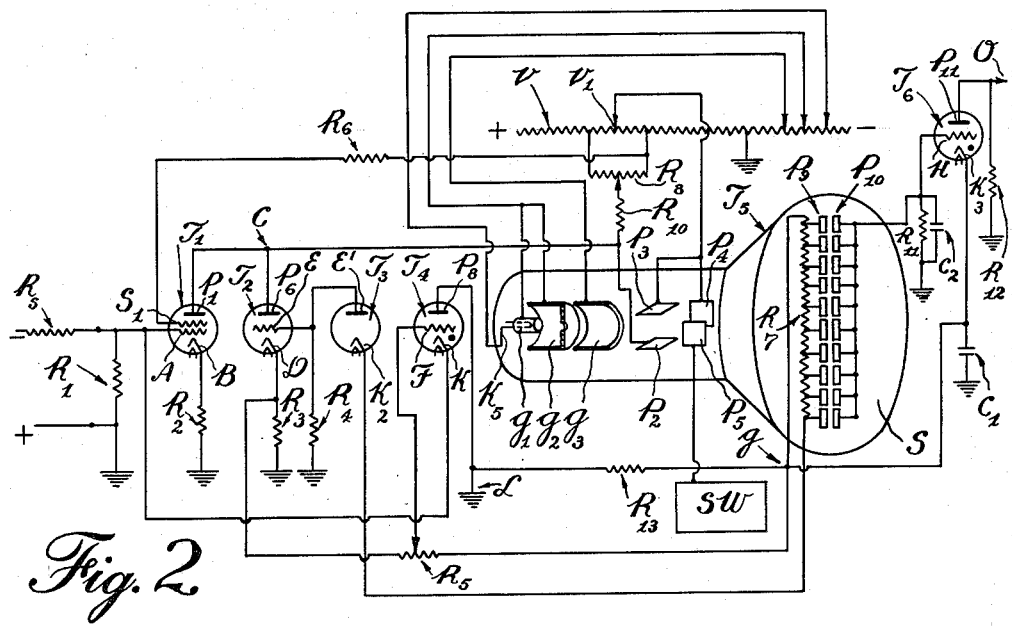
Fig. 2 is a diagrammatic representation of a preferred form of counter unit.

Fig. 2 illustrates diagrammatically the elements of one counter unit. As there shown the device comprises a screen grid tube $T_1$, a triode $T_2$, a diode $T_3$, a gas filled triode $T_4$, a special form of cathode-ray tube $T_5$, and a second gas filled triode $T_6$. Tube $T_4$ is of the type in which the control grid must swing positive with respect to the cathode to trigger the tube. Tube $T_6$ is designed to be triggered when its grid is at the same potential as the cathode. A source of voltage for the various tubes is indicated by the voltage divider V having suitable taps to provide the positive and negative voltages required.

The incoming signal to operate the counter is preferably in the form of a square wave and is negative with respect to ground. It is conducted through resistor $R_s$ to the grid A of tube $T_1$ and is impressed across a resistor $R_1$ which connects to the ground so that the signal causes a voltage drop across resistor $R_1$ to thereby place a negative bias on the grid A.

The cathode B of tube $T_1$ is grounded through a resistor $R_2$. The screen grid $S_1$ is connected to a suitable point on the voltage divider V through a resistor $R_6$. The plate $P_1$ of tube $T_1$ is connected to the voltage divider V through a resistor $R_{10}$ and a potentiometer $R_8$, the ends of which are connected to suitable taps on the voltage divider whereby the plate voltage of the tube may be suitably adjusted. The plate $P_1$ is also connected to the vertical deflecting plate $P_2$ of the cathode ray tube $T_5$, the opposite vertical plate $P_3$ being connected to the voltage supply V at a point $V_1$ so located as to place a suitable positive voltage on this plate. One of the horizontal deflecting plates $P_4$ of the cathode ray tube is connected to the voltage supply for the plate $P_3$, and the opposite horizontal deflecting plate $P_5$ is connected to any suitable source of electrical oscillations as indicated at SW whereby the electronic beam of the cathode ray tube may be caused to sweep horizontally in time with said oscillations while being deflected vertically by the plates $P_2$, $P_3$.

The tube $T_2$ has its plate $P_6$ connected at point C is parallel with the plate $P_1$ of the tube $T_1$, and the grid of the tube $T_2$ is connected to the plate E' of the diode $T_3$, and also to the ground through a resistor $R_4$. The cathode D of the tube $T_2$ is connected to the ground through a resistor $R_3$ and is also connected to one terminal of a potentiometer $R_5$. The cathode K of the tube $T_4$ is connected to the grid A of the tube $T_1$. The grid F of tube $T_4$ is connected to the movable arm of the potentiometer $R_5$, and the plate $P_8$ of this tube is grounded at L.

The cathode ray tube $T_5$ is provided with a screen S of fluorescent material on which are mounted a series of conducting plates or contacts $P_9$ and $P_{10}$ which are serially numbered from zero to 9 as shown in Fig. 1. The plates $P_9$ are all connected to equidistantly spaced taps on a resistor $R_7$ which may be located within the tube or may be outside the tube and connected by suitable conductors to said plates. One end of the resistor $R_7$ is connected at the point G to the remaining terminal of the potentiometer $R_5$, and through a resistance $R_{13}$ to the ground at L. The opposite end of the resistor $R_7$ is connected to the cathode $K_2$ of the diode $T_3$.

The plates $P_{10}$ are all connected together, and may in fact form if desired a continuous strip. These plates are connected to the grid H of the gas-filled tube $T_6$, which grid is also connected to the ground through a resistor $R_{11}$, and by-pass condenser $C_2$. The cathode $K_3$ of tube $T_6$ is connected to the resistor $R_7$ at the point G, and is by-passed to the ground through condenser $C_1$. The plate $P_{11}$ of the tube $T_6$ is connected to the ground through a resistor $R_{12}$, and has an output terminal O whereby voltages impressed across the resistor $R_{12}$ may be used to operate the following unit of the counter, or any suitable signalling device if so desired.

The cathode $K_5$ and the accelerating and focusing grids $G_1$, $G_2$ and $G_3$ of the cathode ray tube $T_5$ are connected as indicated to the voltage divider V so as to place suitable potentials on these elements.

When the device is idle, the grid A of the tube $T_1$ is at ground potential, the point C, and consequently the plates $P_1$ and $P_6$ of tubes $T_1$ and $T_2$ respectively and plate $P_2$ of the cathode ray tube are at some positive voltage less than that of plate $P_3$ such as to allow the plate $P_3$ of the cathode ray tube $T_5$ to deflect the electronic beam so that it sweeps across the pair of contacts $P_9$ and $P_{10}$ which are numbered zero. The cathode D of tube $T_2$ is at a positive voltage which balances the negative voltage of the point G due to the flow of electrons from the contacts $P_9$ to the ground at L through the resistor $R_{13}$, so as to place the grid F of the tube $T_4$ at ground potential. This adjustment is secured by manipulation of the arm of potentiometer $R_5$. The plate E' of the tube $T_3$ has a small negative potential impressed thereon by virtue of the current flowing from the resistor $R_7$ through the diode $T_3$, to the ground, causing a voltage to be impressed across the resistor $R_4$. It will be noted that the electrons from the beam of the cathode ray tube can flow to the ground from both ends of the resistor $R_7$, through the resistor $R_{13}$, and through diode $T_3$ and resistor $R_4$ respectively. At this time, since the beam is striking the zero contacts, the major part of the resistor $R_7$ is in the path comprising the diode $T_3$ and resistor $R_4$, so that most of the electrons flow through the resistor $R_{13}$, and the point G is consequently negative to the maximum amount.

Figure 3:
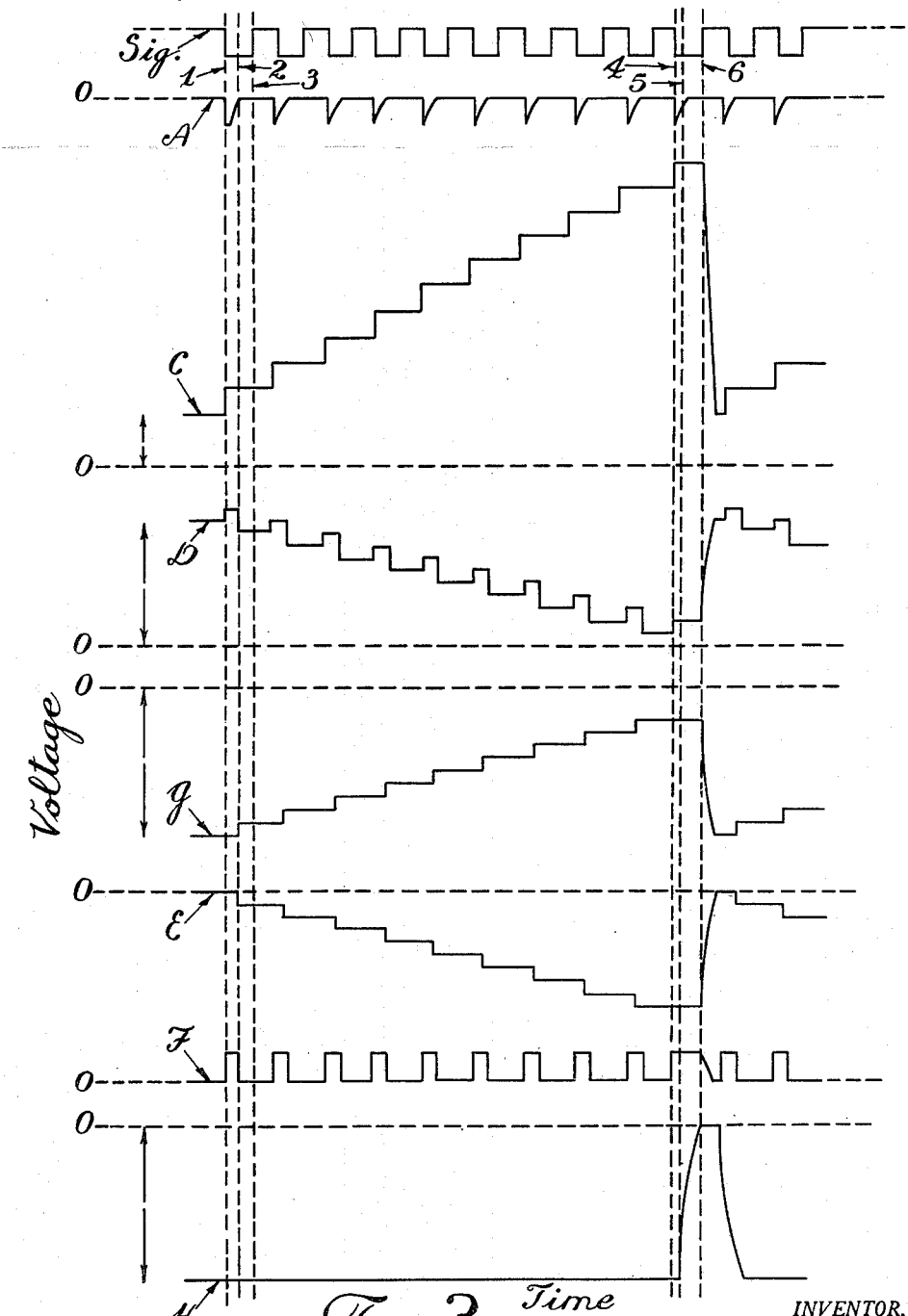
Fig. 3 is a diagrammatic representation of the voltage changes at the significant points in the various circuits during the stages of operation of the device.

These relationships are graphically illustrated in Fig. 3 of the drawing where the voltages of the various elements are plotted vertically, the elapse of time being indicated by horizontal distances. It will be understood that these graphs are not quantitative but merely indicate the character and sequence of the voltage changes at the various points. Zero voltage is in each case indicated by the dotted line marked zero, and distances above or below that line represent positive or negative voltages respectively.

At the time instant represented by the vertical dotted line I, a signal voltage is received as indicated by the line marked Sig., in the form of a negative impulse. This voltage is impressed on the grid A of the tube $T_1$ (see line "A" of Fig. 3) which negative bias decreases the plate current through said tube, thereby raising the voltage at the point C and consequently raising the voltage of the plate $P_6$ of tube $T_2$. It also raises the voltage of the vertical deflecting plate $P_2$ of the cathode ray tube $T_5$, thus causing the beam of said tube to be deflected from the number zero plate to the number one plate. At the same time, the increase in voltage at the point C causes more plate current to flow through the tube $T_2$ which increases the voltage drop across the resistor $R_3$ and consequently raises the potential of the cathode D of the tube $T_2$. These changes in voltage at points C and D are indicated in Fig. 3 by the first upward steps in the lines C and D respectively.

When the cathode D of tube $T_2$ is thus caused to become more positive, the balance of the potentiometer $R_5$ is disturbed and the voltage of the grid F of the tube $T_4$ which is connected to the arm of the potentiometer is made positive with respect to ground. This triggers the tube $T_4$ which becomes conductive, thereby grounding the grid A of tube $T_1$ so as to remove the effect of the signal therefrom. Since tube $T_4$ is a gas-filled tube, it remains conductive as long as the signal impulse lasts thus holding the point A at zero potential until the flow of current ceases and the tube heals. It will be understood that the breakdown time of the gas-filled tube $T_4$ is substantially longer than the duration of the steps necessary to readjust the grid bias thereon, so that the signal voltage cannot operate directly to trigger the tube.

When the beam of the cathode ray tube $T_5$ hits the number 1 plates at the time instant indicated by the vertical dotted line 2, the point G becomes less negative by virtue of the voltage drop across that portion of the resistor $R_7$ between the zero plate and the number one plate. This change in the potential of the point G balances the increase in the positive potential of the point D, which accordingly brings the grid F of tube $T_4$ back to ground potential. At the same time, the flow of current through the tube $T_3$ and resistor $R_4$ increases since some of the resistor $R_7$ has been removed from this path. Consequently the plate E' of the diode $T_3$ and the grid of the tube $T_2$ become more negative by virtue of the increased voltage drop across the resistor $R_4$ which increased negative bias of said grid compensates for the increase in plate voltage of the tube $T_2$, thus reducing the voltage drop across the resistor $R_3$ and consequently reducing the voltage on the cathode D of tube $T_2$ and holding the voltage of the grid F of tube $T_4$ at or below zero.

This operation thus leaves the grid A of tube $T_1$ at ground potential, the point C, and consequently the vertical deflecting plate $P_2$ of the cathode ray tube more positive by one unit, the point G less negative by one unit, the grid E of tube $T_2$ more negative by one unit, the cathode D of tube $T_2$ less positive by one unit, with the grid F of the tube $T_4$ returned to ground potential, all as indicated by the displacements of the correspondingly lettered lines in Fig. 3. The next 8 steps are cumulative in their effect, the grid H of the gas-filled tube $T_6$ being continuously maintained negative by the electronic flow from the beam of the cathode ray tube through the resistor $R_{11}$ to ground, thus maintaining the tube $T_6$ non-conductive.

At the 10th step, the beam of the cathode ray tube passes beyond the plates numbered 9, and consequently the electronic flow through resistors $R_7$ and $R_{11}$ is interrupted. The grid H of tube $T_6$ is thereby raised to ground potential by virtue of its connection through the resistor $R_{11}$, thus making the tube $T_6$ conductive which thereby brings the point G to ground potential at which time the current through tube $T_6$ ceases and the tube becomes non-conductive. The impulse caused by the discharge of condenser $C_1$ through the tube $T_6$ causes a voltage to be impressed across the resistor $R_{12}$ which may be used by suitable connection to the output terminal 0 to operate a succeeding unit of the counter or a suitable signal.

At the same time, the grid of the tube $T_2$ is brought to ground potential. This makes the resistance of tube $T_2$ small, thereby reducing the voltage of the point C and consequently the deflection of plate $P_2$ so that the beam of the cathode ray tube $T_5$ returns to the zero position, whereby the next signal impulse starts a new progression of the beam across the numbered plates $P_9$, $P_{10}$.

It will be understood that a sufficient number of units will be operated in cascade to provide the capacity necessary for cumulating the desired quantity of recorded impulses for the purpose in view. The sweep circuit oscillations applied to the horizontal plates $P_4$, $P_5$ by the connection SW causes the beam to trace a horizontal line on the screen S of the cathode ray tube whereby the number of impulses cumulated by the counter may be easily read and/or recorded photographically.

Although but one form of the invention has been shown and described in detail, it will be understood that other forms are possible and that various changes may be made in the design and arrangement of the parts without departing from the spirit of the invention as defined in the claims appended hereto.

What is claimed is:

1. An electronic counter unit comprising a cathode ray tube having a pair of deflection plates and a target comprising a series of equally spaced contacts; a resistor having a corresponding number of equally spaced taps connected to said contacts, means including an electronic tube responsive to an electrical impulse for changing the voltage across said deflection plates by a unit amount sufficient to deflect the electronic beam of the cathode ray tube from one contact of the target to the next; means including a second electronic tube controlled by the voltage drop across said resistor for maintaining the voltage across the deflection plates after the dissipation of said impulse, and means including a third electronic tube responsive to the change in plate current of the second electronic tube for removing the effect of said impulse from the first electronic tube.

2. An electronic counter unit as set forth in claim 1 in which the third electronic tube is arranged to be normally non-conductive, but is rendered conductive responsive to said change in plate current of the second electronic tube, and remains conductive as long as said impulse persists.

3. An electronic counter unit as set forth in claim 1 including further, means comprising a fourth electronic tube responsive to movement of the electronic beam of the cathode ray tube beyond the last target contact for removing the cumulated changes of voltage across the deflection plates of the cathode-ray tube and simultaneously generating a usable electrical impulse.

4. An electronic counter unit as set forth in claim 1 in which the target of the cathode-ray tube is provided with a supplemental contact spaced laterally from said series of contacts, means causing the electronic beam of the cathode ray tube to sweep across said supplemental contact, means including a fourth electronic tube for removing the cumulated changes of voltage across the deflection plates of the cathode ray tube when said fourth electronic tube is conductive, and means responsive to the flow of current from said supplemental contact for maintaining said fourth electronic tube non-conductive.

THEODORE K. RIGGEN.

REFERENCES CITED

The following references are of record in the file of this patent:

UNITED STATES PATENTS

| Number | Name | Date |
|---|---|---|
| 1,929,067 | Hund | Oct. 3, 1933 |
| 1,976,400 | Ilberg | Oct. 9, 1934 |
| 2,057,773 | Finch | Oct. 20, 1936 |
| 2,224,677 | Hanscom | Dec. 10, 1940 |
| 2,267,827 | Hubbard | Dec. 30, 1941 |
| 2,404,106 | Snyder, Jr. | July 16, 1946 |
| 2,441,296 | Snyder, Jr. | May 11, 1948 |
| 2,446,945 | Morton et al. | Aug. 10, 1948 |